E. L. DEWALD.
FISH SCREEN.
APPLICATION FILED JAN. 16, 1914.

1,121,075.

Patented Dec. 15, 1914.

Witnesses
G. M. Spring
W. E. Valk Jr.

Inventor
Edgar L. Dewald,
by Richard Bowen
his Attorney

UNITED STATES PATENT OFFICE.

EDGAR L. DEWALD, OF OTTAWA, KANSAS.

FISH-SCREEN.

1,121,075.  Specification of Letters Patent.  Patented Dec. 15, 1914.

Application filed January 16, 1914. Serial No. 812,501.

*To all whom it may concern:*

Be it known that I, EDGAR L. DEWALD, a citizen of the United States, residing at Ottawa, in the county of Franklin and State of Kansas, have invented certain new and useful Improvements in Fish-Screens, of which the following is a specification.

This invention relates to fish screens of that general class especially designed for use in irrigating ditches, canals, flumes and the like to prevent the fish from following the course of the stream and eventually becoming stranded upon the land.

The object of the invention is to provide a revolving screen in the nature of an especially constructed water wheel, which when positioned in the ditch, flume or other water course will afford an effectual barrier to the passage of fish without liability of becoming clogged or otherwise obstructed by leaves, twigs and floating debris.

A still further object of the invention resides in the provision of a water wheel, the blades of which are mounted in such a novel and peculiar manner as to forcibly contact the surface of the water, during a rotation of the wheel, to thereby sound a report whereby approaching fish within the stream will become frightened and thus made to turn and swim the opposite way.

A further object of the invention is to generally improve this class of devices so as to increase their utility, durability and efficiency.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
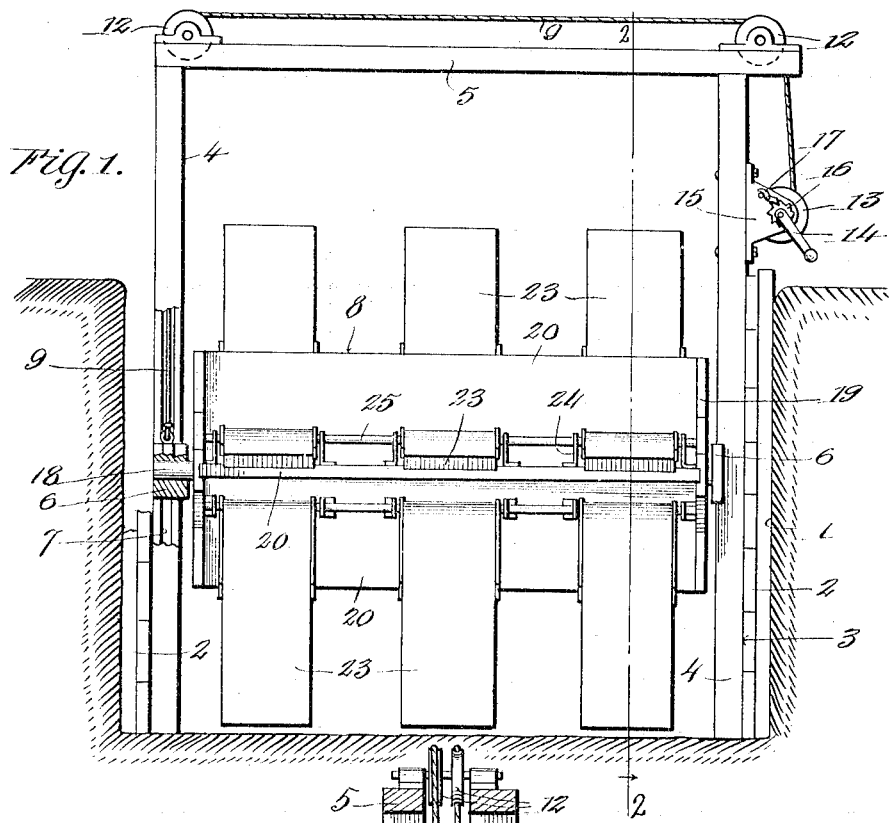
Figure 2:
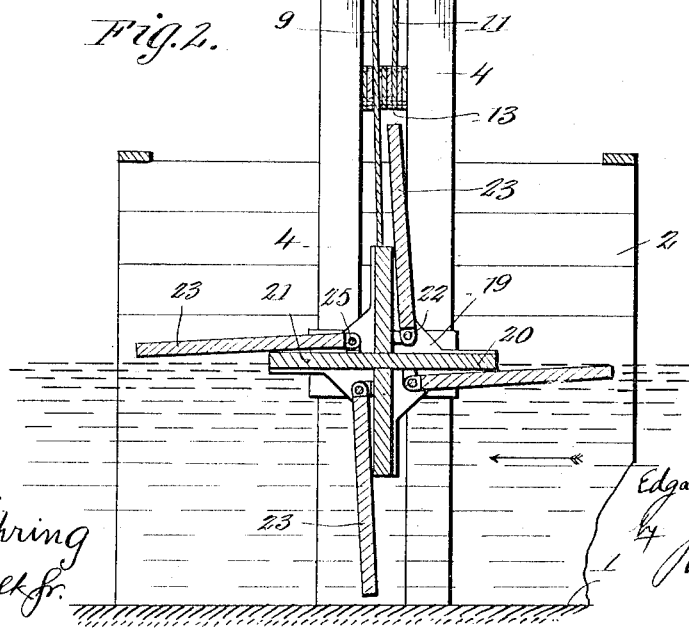

Figure 1 is a side elevation of a fish screen constructed in accordance with the present invention; and Fig. 2 is a vertical sectional view on the line 2—2 of Fig. 1.

Referring now to the drawings by numeral, 1 designates the water way within which the device comprising the invention is to be operated, the power necessary to operation being derived by the flow of water within the stream. To prevent the banks of the stream from washing away at a point adjacent the location of the screen, reinforcing elements or bank guards 2 have been provided, the same being maintained in the desired vertical position through the medium of the frame, designated 3, between the sides of which the fish screen is arranged.

The frame 3 in its preferred embodiment comprises a plurality of standards 4, arranged in pairs, one pair upon each side of the screen, the corresponding standards of the respective pairs being connected at their top by means of suitable cross beams 5, one end of each beam 5 extending beyond the outer edge of the said standards 4 as is clearly illustrated in Fig. 1 of the drawings.

Castings 6 are provided, one upon each side of the screen, the said castings being so shaped as to overlap the standards 4 and to extend into the space between the standards of each pair so as to fit grooves 7 formed upon the adjacent faces of the said standards, the said grooves serving as a guide means whereby the castings 6 may be adjusted vertically to in this manner provide for the vertical adjustment of the fish screen, designated 8, supported thereby and operable within the stream. To effect such vertical adjustment, I provide a suitable flexible supporting element 9, one end of which is connected as at 10 to one of the castings 6, and a second supporting element 11 one end of which is connected to the other of the said castings 6, the said two elements being arranged over suitable pulleys 12 provided therefor, both being connected at their opposite ends to a drum 13 mounted for rotation upon a crank shaft 14 journaled in bearings 15 detachably secured to the frame 3, preferably at one side thereof. As a means whereby the said drum may be locked against rotation, I provide a suitable ratchet 16 and pivoted pawl 17, the latter being engageable with the ratchet for an obvious purpose.

Passing on to the description of the screen construction, 18 designates a suitable spindle, and as two of these spindles are necessary for the proper mounting of the revolving screen 8, one of the said spindles is provided for and disposed upon each end of the screen, the said spindles being journaled within the respective castings 6. To each spindle is secured a specially formed casting 19, between extensions of which transverse blades 20 and a water wheel 21 are secured. To each blade 20 is pivotally secured as at 22 a plurality of auxiliary blades 23 so positioned with respect to the wheel 21 as to fall by gravity, during the rotation of the wheel, upon the surface of the screen to thereby produce a loud report.

Upon reference to the drawings, it will be noted that the blades 20 extend from one to the other of the castings 19, while the auxiliary blades 23 are disposed in spaced relation, a series of blades being provided for each blade 20, the space between the said auxiliary blade providing for the passage of leaves, twigs and other debris from one to the other side of the screen.

Brackets 24 are secured to the several blades 20 as a support for rods 25 arranged in parallel relation, the said rods serving as a retaining element for the auxiliary blade 23, the latter being pivoted as at 22 thereto.

It is to be understood that the size of the screen may be varied to correspond with the size and depth of the stream within which it is arranged. When it is desired that the entire screen be raised or lowered, such movement may be effected by manipulation of the crank shaft 14. The rotation of the said shaft 14 will correspondingly rotate the drum 13 and wind the flexible elements 10, 9 and 11 thereupon, and as the said elements are connected to the castings 6, it is apparent that the entire screen may be bodily raised or lowered to position the longitudinal axis of the wheel 21 upon the same plane as the surface of the screen, as the said wheel, when thus positioned is best adapted to the use for which it is designed.

It is to be understood that the device acts only as a fish scare, the report caused by the falling blades contacting the surface of the water being such in its nature as to prevent the approach of fish. Even when elevated, in the event of a rise in the water, the noise created by rotation of the wheel is such as to prevent fish from approaching the device, thereby precluding passage of the fish beneath the said device when thus raised.

From the above, taken in connection with the accompanying drawings, it will be noted that by pivotally connecting the several auxiliary blades to the blades 20 of the water wheel, the former during the rotation of the latter, will fall by gravity upon the surface of the stream, and as the broad side of the said auxiliary blades come in contact with the water, an outlandish noise in the nature of a loud report is produced which, upon practical application of the device, has been found efficient in frightening the fish and causing them to turn and swim up-stream.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A fish screen including a rotatable water wheel, means operable to maintain the axis of rotation of said wheel upon substantially the same plane as the surface of the water within which it is arranged, and a plurality of auxiliary blades hingedly connected to the said wheel, the blades being adapted to fall by gravity during rotation of the wheel upon the surface of the water, as and for the purpose set forth.

2. A fish screen including a rotatable water wheel, a frame therefor, means operable upon the frame to bodily raise and lower said wheel, said wheel being rotated by the flow of the passing stream, and means including a plurality of auxiliary blades pivoted to said water wheel, said blades adapted to contact forcibly the surface of the water during the rotation of the said wheel, as and for the purpose set forth.

3. A fish screen rotatable by operation by the flow of a passing stream, a frame for said screen, means operable upon said frame whereby said screen may be bodily raised or lowered to vary the position of the screen according to the rise and fall of water within the stream, and means including a plurality of auxiliary blades pivoted to each wheel blade, said auxiliary blades adapted to forcibly contact the surface of the stream during rotation of said water wheel, as and for the purpose set forth.

4. A fish screen including a supporting frame, the upright portions of the said frame having grooves extending longitudinally thereof, a screen member operable between the said uprights of said support, said screen member being rotatable by the flow of a passing stream, said screen member comprising a water wheel, spindles disposed upon the extremities thereof, castings slidable vertically throughout the length of said grooves, said castings providing journals for said spindles, means operable upon said frame for raising and lowering said screen bodily to position the longitudinal axis of the screen upon the same plane as the surface of the water, and means including a plurality of auxiliary blades pivoted to each wheel blade, said blades adapted to forcibly contact the surface of the stream during the rotation of said screen member, as and for the purpose set forth.

In testimony whereof I affix my signature in presence of two witnesses.

EDGAR L. DEWALD.

Witnesses:
W. R. ALLISON,
CARL J. ASHE.

Copies of this patent may be obtained for five cents each, by addressing the "Commissioner of Patents, Washington, D. C."